US008275380B2

(12) United States Patent
Iwamura et al.

(10) Patent No.: US 8,275,380 B2
(45) Date of Patent: Sep. 25, 2012

(54) CELL INFORMATION TRANSMISSION METHOD AND USER APPARATUS IN MOBILE COMMUNICATIONS SYSTEM

(75) Inventors: Mikio Iwamura, Yokohama (JP); Minami Ishii, Yokohama (JP); Yasuhiro Kato, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 329 days.

(21) Appl. No.: 12/531,582

(22) PCT Filed: Mar. 18, 2008

(86) PCT No.: PCT/JP2008/054980
§ 371 (c)(1),
(2), (4) Date: Nov. 9, 2009

(87) PCT Pub. No.: WO2008/123071
PCT Pub. Date: Oct. 16, 2008

(65) Prior Publication Data
US 2010/0075684 A1  Mar. 25, 2010

(30) Foreign Application Priority Data

Mar. 20, 2007  (JP) ................................ 2007-073735

(51) Int. Cl.
*H04W 40/00* (2009.01)
(52) U.S. Cl. .................. 455/449; 455/432.1; 455/435.1; 455/435.2; 455/436; 455/442; 455/443; 455/444; 370/310.2; 370/328; 370/331; 370/332; 370/333; 370/338
(58) Field of Classification Search .................. 455/432, 455/1, 435.1, 435.2, 436, 442–444, 448–449; 370/310.2, 328, 331–334, 338
See application file for complete search history.

(56) References Cited

U.S. PATENT DOCUMENTS

| 6,236,651 | B1 * | 5/2001 | Kassinen et al. ............... 370/347 |
| 6,278,699 | B1 * | 8/2001 | Atarius .......................... 370/324 |
| 6,614,772 | B1 * | 9/2003 | Sexton et al. .................. 370/335 |
| 6,781,967 | B1 * | 8/2004 | Young ............................ 370/312 |
| 7,379,749 | B2 * | 5/2008 | Doi et al. ........................ 455/525 |
| 7,830,907 | B1 * | 11/2010 | Petranovich et al. .......... 370/436 |
| 2004/0192313 | A1 * | 9/2004 | Otting ............................ 455/446 |

FOREIGN PATENT DOCUMENTS

| CN | 1343427 A | 4/2002 |
| EP | 2 056 610 A1 | 5/2009 |
| JP | 2004-120258 A | 4/2004 |
| JP | 2006-173778 A | 6/2006 |

(Continued)

OTHER PUBLICATIONS

International Search Report w/translation from PCT/JP2008/054980 dated Jul. 1, 2008 (4 pages).

(Continued)

*Primary Examiner* — Steve D Agosta
(74) *Attorney, Agent, or Firm* — Osha Liang LLP (57) ABSTRACT

A method of transmitting cell information is disclosed. The method includes the steps of transmitting a primary broadcast channel at constant intervals in a cell of a mobile communications system; broadcasting, in the primary broadcast channel, scheduling information indicating a location of a first scheduling unit, including information to be broadcast in the cell; and broadcasting, in the first scheduling unit, information indicating whether the cell is a dominant cell or a subordinate cell.

7 Claims, 6 Drawing Sheets

FOREIGN PATENT DOCUMENTS

| | | |
|---|---|---|
| WO | 0054537 A2 | 9/2000 |
| WO | 2008/023611 A1 | 2/2008 |

OTHER PUBLICATIONS

Written Opinion from PCT/JP2008/054980 dated Jul. 1, 2008 (3 pages).

3GPP TSG-RAN WG2 Meeting #57; R2-070674; "Transmission of time critical system information"; Samsung; St. Louis, USA; Feb. 12-16, 2007 (8 pages).

Patent Abstracts of Japan; Publication No. 2004-120258 dated Apr. 15, 2004; NTT DoCoMo, Inc. (1 page).

Patent Abstracts of Japan; Publication No. 2006-173778 dated Jun. 29, 2006; NTT DoCoMo, Inc. (1 page).

3GPP TSG RAN WG2 #54, R2-062171; "Multi-band/carrier operation (1)—cell configuration"; NTT DoCoMo, Inc.; Tallinn, Estonia; Aug. 28-Sep. 1, 2006 (5 pages).

3GPP TSG RAN WG2 #54, T2-062172; "Multi-band/carrier operation (2)—load balancing"; NTT DoCoMo, Inc.; Tallinn, Estonia; Aug. 28-Sep. 1, 2006 (6 pages).

3GPP TSG RAN WG2 #56, R2-063391; "Multi-band/carrier operation (1)—cell configuration"; NTT DoCoMo, Inc.; Riga, Latvia; Nov. 6-10, 2006 (5 pages).

3GPP TS 36.300, V1.0.0; "Evolved Universal Terrestrial Radio Access (E-UTRA) and Evolved Universal Terrestrial Radio Access Network (E-UTRAN)"; Mar. 19, 2007 (82 pages).

Chinese Office Action for Application No. 200880016839.7, mailed on Oct. 19, 2011 (8 pages).

English abstract for Chinese Publication No. 1343427, publication date Apr. 3, 2002, esp@cenet database, (1 page).

* cited by examiner

CELL INFORMATION TRANSMISSION METHOD AND USER APPARATUS IN MOBILE COMMUNICATIONS SYSTEM

BACKGROUND OF THE INVENTION

1. Field of the Invention

The present invention generally relates to the field of mobile communications, and more specifically relates to a cell information transmission method and user apparatus in mobile communications systems using Next generation mobile communications techniques.

2. Description of the Related Art

As a communications scheme to succeed W-CDMA, HSPDA, and HSUPA schemes, Long Term Evolution (LTE) is being studied in a standardization body called 3GPP. If the LTE radio access scheme becomes commonplace, it is anticipated that the LTE carriers/bands will be increased in order to increase system capacity. Then, depending on the operator, an existing UMTS carrier may be switched to an LTE carrier. For example, when first starting from a 5-MHz system to enhance to a 20-MHz system, it is possible to operate a single 20-MHz layer or to operate four 5-MHz layers in parallel.

Here, in a system having multiple carriers/bands, the load could be distributed unevenly on a certain carrier/band, so that radio resources could not be utilized effectively. This is mainly caused by too many carriers for which a user apparatus (UE) can stand by, difference in path loss among different bands/carriers, and coexistence of UEs of different capabilities. Particularly when carriers/bands are added in order to increase the system capacity, what is carrier/band ready and what is not coexist depending on the UE, causing a possible uneven distribution in the workload to specific carriers/bands. Such a situation brings about a problem that OAM control may become cumbersome for load balancing to smooth the uneven distribution of the workload.

In order to avoid such a problem, it is effective to use all layers (carriers/bands) to distribute a service while limiting a layer for which the user apparatus (UE) can standby. This is because limiting the number of layers which allows standing by for makes it possible to reduce the overhead of a paging channel (PCH) and a broadcast channel (BCH) and the burden of load balancing for standing by, so as to make it possible to simplify the OAM control as a result.

Limiting the number of layers allowing standing by for limits layers to be paged to only the layers allowing standing by for, making it unnecessary to transmit all system information sets in all layers. In order to implement the above, a configuration using two types of cells is being proposed (for example, see Non-patent document 1). In this proposal, two types of cells (i.e., a dominant cell, which allows the UE to stand by for, and a subordinate cell, which does not allow the UE to standby for) are set up. In the dominant cell, a synchronization channel (SCH), a full-broadcast channel (Full-BCH), a paging channel (PCH), and the other channels required for the UEs autonomous operation) are transmitted. On the other hand, in the subordinate cell, only the synchronization channel (SCH) and an information-limited broadcast channel (limited-BCH) are transmitted so as to reduce overhead.

Non-patent document 1: "Multi-band/carrier operation (1)-cell configuration", Tdoc-R2-063391, 3GPP TSG RAN WG2 #56, 6-10 Nov. 2006, Riga, Latvia

SUMMARY OF THE INVENTION

Problem(s) to be Solved by the Invention

It is an important matter for a user apparatus (UE) to know whether a call an own station is seeking to connect to is a dominant cell or a subordinate cell. This is because, in the subordinate cell, the paging channel is not transmitted, so that the UE cannot stand by for. On the other hand, the UE which has undergone a handover to the subordinate cell from a different cell may continue communicating (transmitting and receiving) in the subordinate cell.

Thus, it is an object of the invention to provide, in a mobile communications system carrying multiple carrier frequencies, a method of transmitting cell information, and a user apparatus that make it possible to simplify determining whether a cell a UE is seeking to connect to is a dominant cell or a subordinate cell.

Means for Solving the Problem

In order to achieve the problem solution as described above, in a first aspect, a method of transmitting cell information in a mobile communications system is provided. The method includes the steps of:

transmitting a primary broadcast channel at constant intervals in a cell of a mobile communications system;

broadcasting, in the primary broadcast channel, scheduling information indicating a location of a first scheduling unit, including information to be broadcast in the cell; and broadcasting, in the first scheduling unit, information indicating whether the cell is a dominant cell or a subordinate cell.

As an example, the first scheduling unit includes a flag indicating whether the cell is a dominant cell or a subordinate cell. Alternatively, it may be arranged such that the first scheduling unit further includes information indicating a location of a second scheduling unit, including additional information to be broadcast in the cell, and a presence of information indicating a location of the second scheduling unit allows determining whether the cell is the dominant cell or the subordinate cell.

In a second aspect, a user apparatus for use in the mobile communications system is provided. The user apparatus has:

a transmitter and receiver which receives a primary broadcast channel from a cell of a mobile communications system and which further receives a first scheduling unit specified in the primary broadcast channel; and a cell determining unit which analyzes the first scheduling unit and determines whether the cell is a dominant cell or a subordinate cell.

In a preferred example, the cell determining unit detects a flag included in the first scheduling unit to determine whether the cell is the dominant cell or the subordinate cell. Alternatively, the cell determining unit determines whether the first scheduling unit includes information indicating a location of a second scheduling unit, including additional information to be broadcast in the cell, and determines that the cell is the dominant cell if the information indicating the location of the second scheduling unit is included.

Advantage of the Invention

The above-described configuration and method make it possible, in a mobile communications system carrying multiple carrier frequencies, to simplify determining whether the cell type is a dominant cell or subordinate cell while reducing overhead.

DESCRIPTION OF THE PREFERRED EMBODIMENTS

Description of Notations

Figure 1:
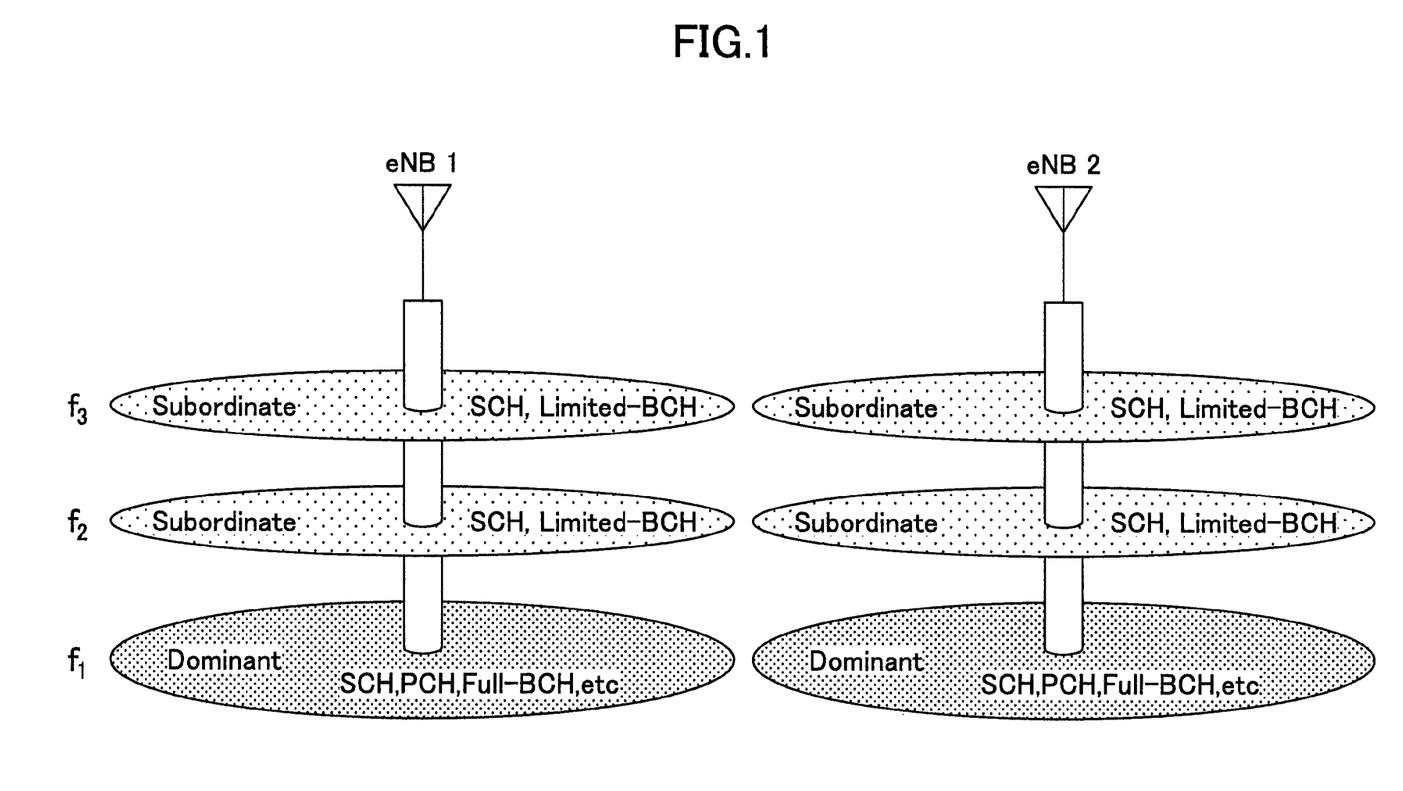
FIG. 1 is a schematic diagram illustrating a cell configuration including a dominant cell and a subordinate cell according to one embodiment of the invention.

10 P-BCH (primary broadcast channel); 11 SU (scheduling unit); 11-1 SU-1 (first scheduling unit); 100 user apparatus (UE); 102 transmit and receive antenna; 104 amplifier; 106 transmitter and receiver; 110 base band processor; 111 layer 1 processor; 112 MAC processor; 113 cell determining unit; 116 application unit Best Mode of Carrying Out the Invention A description is given below with regard to preferred embodiments of the present invention, with reference to the drawings. FIG. 1 is a schematic drawing which illustrates an example of a cell configuration of a mobile communications system to which the invention is applied. Cells of different carrier frequencies are overlaid in a geographic area handled by one base station (eNB). For example, in a geographical area handled by eNB1, carrier frequencies f1, f2, and f3 are provided, of which a cell provided with f1 is a dominant cell. In the dominant cell, a synchronization cell (SCH), a paging channel (PCH), and full-set broadcast channel (Full-BCH), and channels necessary for autonomous operations of the UE are transmitted from eNB1. On the other hand, a cell provided with f2 and a cell provided with f3 are subordinate cells. In these cells, the synchronization channel (SCH) and a propagation information-limited broadcast channel (limited-BCH) are transmitted from eNB1. Similar configuration also applies to a neighboring base station (eNB) 2.

The user apparatus (UE) located in the same geographical area varies in the type and number of channels to be propagated depending on which carrier frequency cell it is in, and whether it can stand by. As described above, broadcast channels (BCH) transmitted in the dominant and subordinate cells vary in the amount of information, but have a common method of transmitting the broadcast channels themselves.

Figure 2:
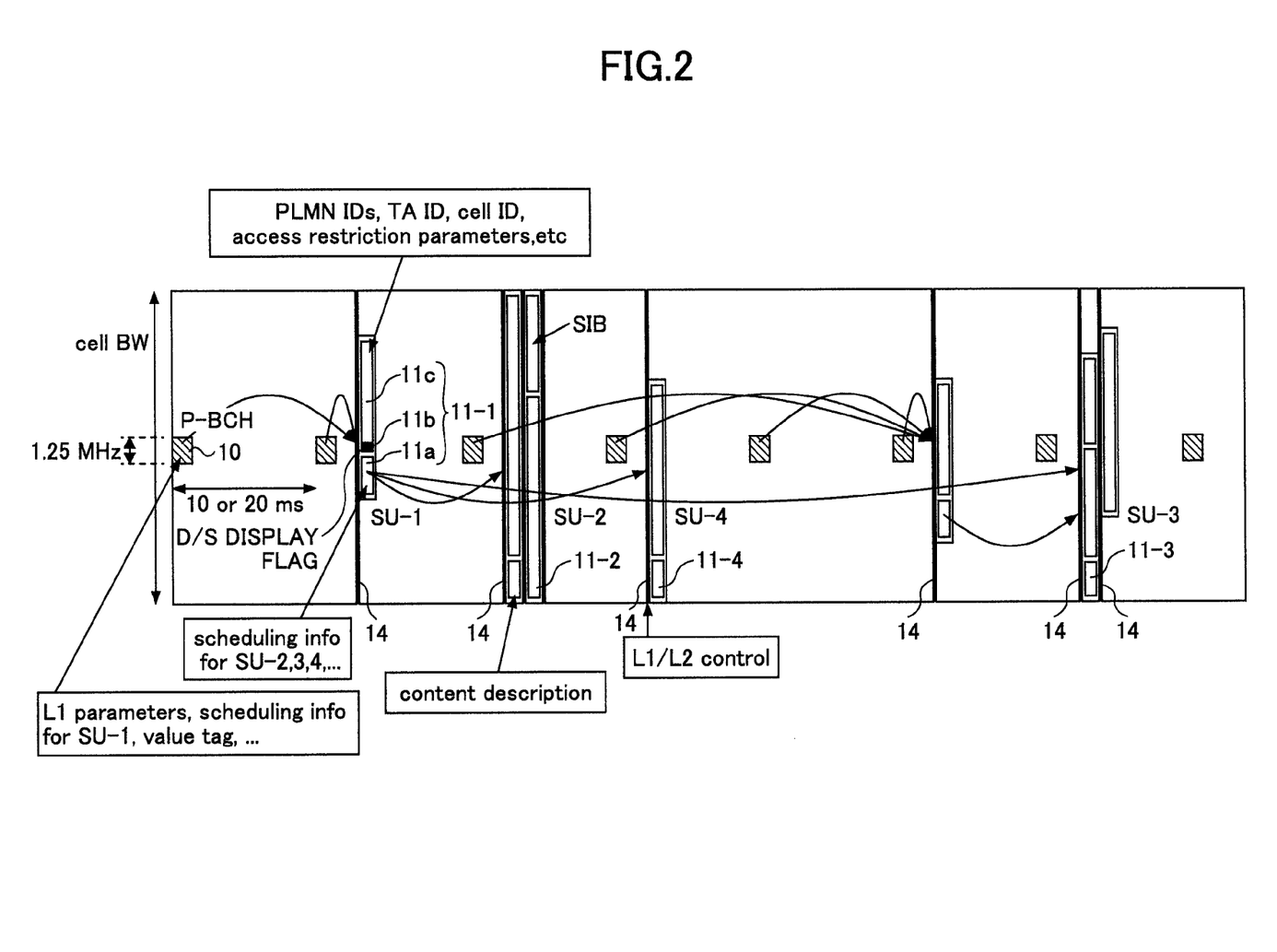
FIG. 2 is a diagram illustrating exemplary transmission of a broadcast channel (BCH) according to an embodiment of the present invention.

FIG. 2 is an exemplary transmission of a broadcast channel (BCH) used in common in both dominant and subordinate cells. For example, as a configuration of transmitting a broadcast channel, a primary broadcast channel (P-BCH) 10 may be repeatedly transmitted once every constant interval, for example, 10-20 ms, and a secondary broadcast channel (S-BCH) (not shown) may be transmitted only when needed. Moreover, a method is possible such that minimum information is transmitted in the P-BCH 10, while other information to be broadcast is dynamically assigned available broadcast channel resources so as to be transmitted. In this example, following the P-BCH 10, broadcast information is divided into four scheduling units (SU) 11 (SU-1 through SU-4) so as to be transmitted. The number of SUs to be transmitted is not limited to four, so that it can be an arbitrary number.

Here, the resource location of the following scheduling unit (SU) 11 is specified using the P-BCH 10, which is periodically transmitted. More specifically, the P-BCH 10 transmits transmit timing information of an L1/L2 control channel 14 that shows the location of a first scheduling unit SU-1, in addition to layer 1 (L1) information such as cell bandwidth and transmit power. The L1/L2 control channel 14 specifies a specific resource block of the corresponding SU-1. The SU-1, which is one of multiple scheduling units (SUs) following the P-BCH 10, includes information showing the location of the remaining scheduling units SU-2 through SU-4. In a normal operation, the SU-1 becomes a unit which conducts information transmission most frequently of the multiple SUs.

Therefore, the user apparatus (UE) first receives the P-BCH 10, which is periodically transmitted in this cell, and receives the L1/L2 control channel 14 specified therein. Then, the first SU-1 is received at a resource location specified in the L1/L2 control channel 14, and scheduling information of the following SU is obtained to receive the SU-2 to SU-4. In this way, transmitting only minimum information in the P-BCH 10 makes it possible to reduce overhead while maintaining performance of cell search and cell selection.

In an embodiment of the present embodiment, information 11b (D/S display information), indicating whether this cell is a dominant cell or a subordinate cell, is placed in the first scheduling unit SU-1. D/S display information 11b may also be inserted into the P-BCH 10, which is a channel received first by the UE, in which case the UE can determine the cell most rapidly. However, the transmit frequency of the P-BCH 10 is quite high, so that, when the D/S display information is transmitted in P-BCH 10 every time, the object to effectively reduce the overhead cannot be achieved. On the other hand, when the D/S display information 11b is transmitted in the SU-2 through SU-4, the timing of cell determination becomes delayed. Thus, the SU-1, which is a scheduling unit first received by the UE after receiving the P-BCH 10, is used to transmit D/S display information as cell determining information.

Figure 3A:
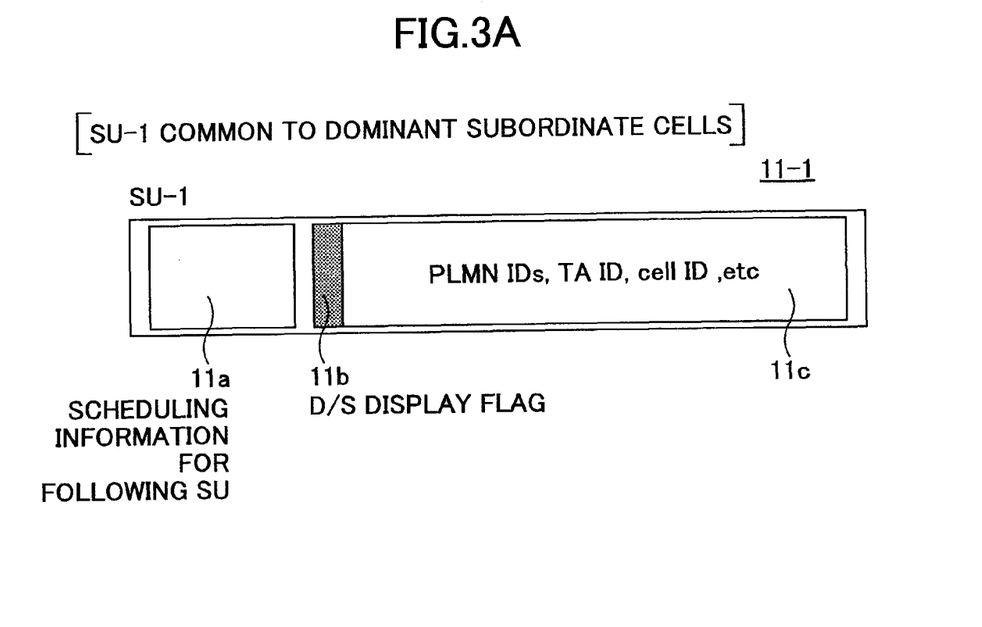
FIG. 3A is a diagram illustrating an exemplary configuration of an initial scheduling unit SU-1 specified in P-BCH.
Figure 3B:
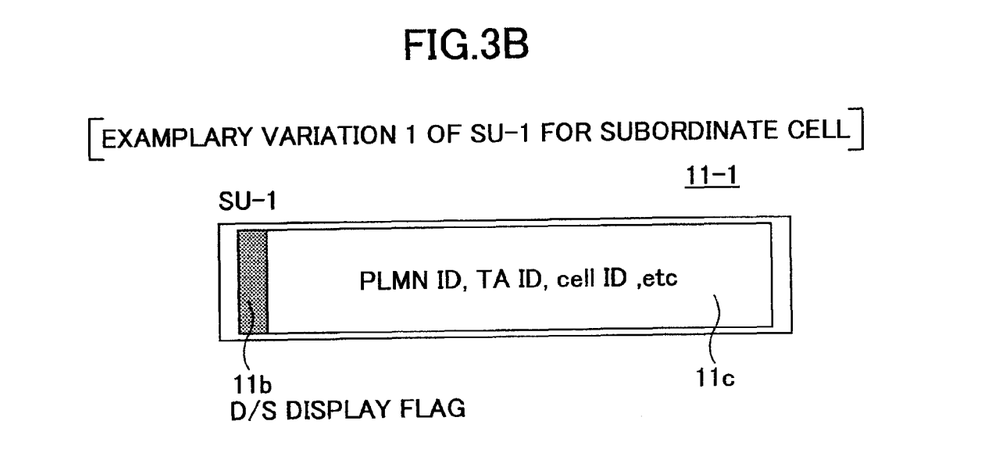
FIG. 3B is a diagram illustrating an exemplary variation of the SU-1 in FIG. 3A.
Figure 3C:
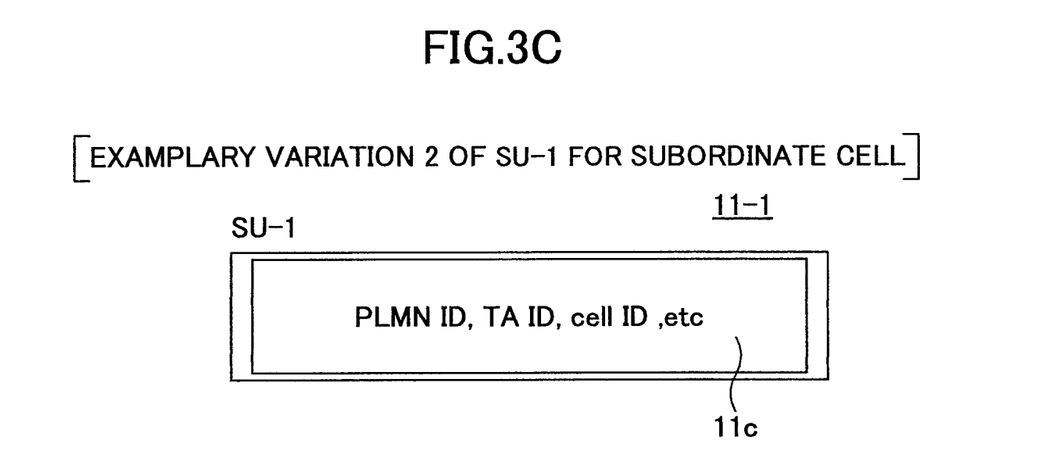
FIG. 3C is a diagram illustrating another exemplary variation of the SU-1 in FIG. 3A.

FIG. 3A through FIG. 3C are diagrams illustrating exemplary configurations of the SU-1. FIG. 3A is an exemplary basic configuration of the SU-1, which is commonly used in dominant and subordinate cells. The SU-1 (11-1) includes a field 11a, which includes scheduling information of the following scheduling units SU-2 through SU-4, a D/S display flag 11b, which is information identifying whether dominant or subordinate cell, and a field 11c, which includes other important broadcast information. Important broadcast information 11c included in the SU-1 includes a PLMN (private land mobile network) ID, a TA (tracking area) ID and a cell ID.

In this configuration, the UE may detect the SU-1 D/S display flag 11b to identify whether a cell which own station is seeking to connect to is a dominant cell or a subordinate cell.

FIG. 3B shows an exemplary variation 1 of the SU-1 transmitted in the subordinate cell. In the exemplary variation 1, scheduling information is transmitted in a full set of SU-1 through SU-4 in the dominant cell, while only the first SU-1 is transmitted and SU-2 and beyond are omitted so as to reduce overhead in the subordinate cell. In this case, the SU-1 (11-1) has a field 11a for L1/L2 control channel information showing the resource location of the following SU omitted, and includes only a D/S display flag 11b and an important broadcast information field 11c.

FIG. 3C shows an exemplary variation 2 of the SU-1 transmitted in the subordinate cell. In the exemplary variation 2, scheduling information is transmitted in a full set of SU-1 through SU-4 in the dominant cell, while only the first SU-1 is transmitted and SU-2 and beyond are omitted as in FIG. 3(b). Moreover, FIG. 3(c) has the D/S display flag 11b also omitted and has only the important broadcast information field 11c. In this case, the UE receives the L1/L2 control channel at a transmit timing specified in the P-BCH 10, and receives the SU-1 using a resource specified in an L1/L2 control channel. The UE determines whether the received SU-1 has a field 11a which includes information of the following SU, and, if the SU-1 does not include the field 11a, determines that the cell is a subordinate cell.

While examples have been shown such that SU-2 and beyond are all omitted in FIGS. 3B and 3C, it may be arranged such that whether the cell is the subordinate cell is determined depending on the presence of specific information elements of SU-2 and beyond. For example, when a parameter (e.g., PCH setting information) required during standby is not present, the cell may be determined as the subordinate cell.

Figure 4:
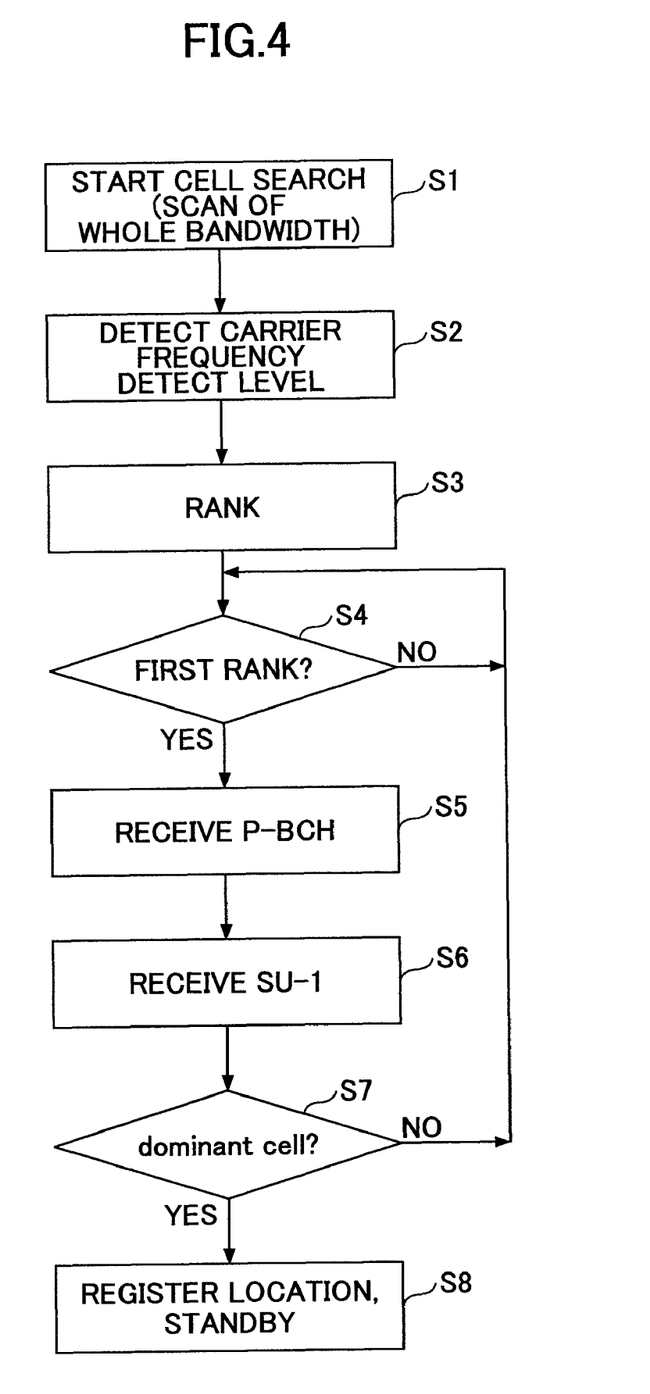
FIG. 4 is a flowchart illustrating an operations flow of a UE according to an embodiment of the present invention.

FIG. 4 is a flowchart illustrating an operations flow of the UE. Here, an example is described of a case such that the UE powers on to conduct an initial cell search, or returns from outside to within the range to conduct a cell search. First, the UE uses a synchronization channel (SCH) to start a cell search using a scan of the whole bandwidth (S1). Next, a carrier frequency (cell) is detected and the level is detected (the power is measured) (S2). For example, for detecting the cell, a P-SCH (primary synchronization channel) common to all cells is received to obtain synchronization for the cells, after which a scrambling code specific to a cell is identified in an S-SCH (secondary synchronization channel) and a cell specified by the scrambling code is detected. For detecting the level, an average value may be taken of the P-SCH and S-SCH, but measuring the power of either one of the P-SCH and S-SCH may suffice as the scan of the whole bandwidth is conducted rapidly.

When the scan of the whole bandwidth is completed, cells detected from the measured power level are ranked (S3). Then, according to the ranking, the P-BCH is received in the order of descending power level (S4 and S5). An L1/L2 control channel for SU-1 is received at a timing specified in the P-BCH, and SU-1, which is the first scheduling unit, is received in a resource block specified in the L1/L2 control channel (S6). The UE determines whether the cell is a dominant cell based on the received SU-1 (S7). As a method of determining, when the SU-1 adopts a configuration of FIG. 3(a) or FIG. 3(b), the D/S display flag 11b is detected When the SU-1 adopts a configuration of FIG. 3(b) or FIG. 3(c), it may be determined depending on whether a field 11a for scheduling information for the following SU is included. Moreover, the type of the cell may be determined depending on whether specific information (e.g., a parameter (PCH setting information, etc.) required during a standby exists.

If the cell is a dominant cell (YES in S7), the UE registers the location of this cell and enters standby (S8). If the cell is not the dominant cell (i.e., it is the subordinate cell; NO in S7), the UE cannot stand by. Thus, the UE receives a P-BCH of a cell with a better power level. Then, the process repeats steps S5 to S7 until the dominant cell is found. In this way, the UE may determine the cell rapidly in an initial cell search.

In the above, while a procedure has been explained such that the UE first conducts a scan of the whole bandwidth, sorts the power level in the descending order, after which the UE successively receives the P-BCH, it may be arranged such that a P-BCH and SU-1 are received successively from a cell found in conducting the scan of the whole bandwidth, after which the UE sorts those which are dominant and which are with an access privilege to select the sorted results. This case may also be arranged in an embodiment of the present invention to make it possible to conduct the initial cell search rapidly.

Figure 5:
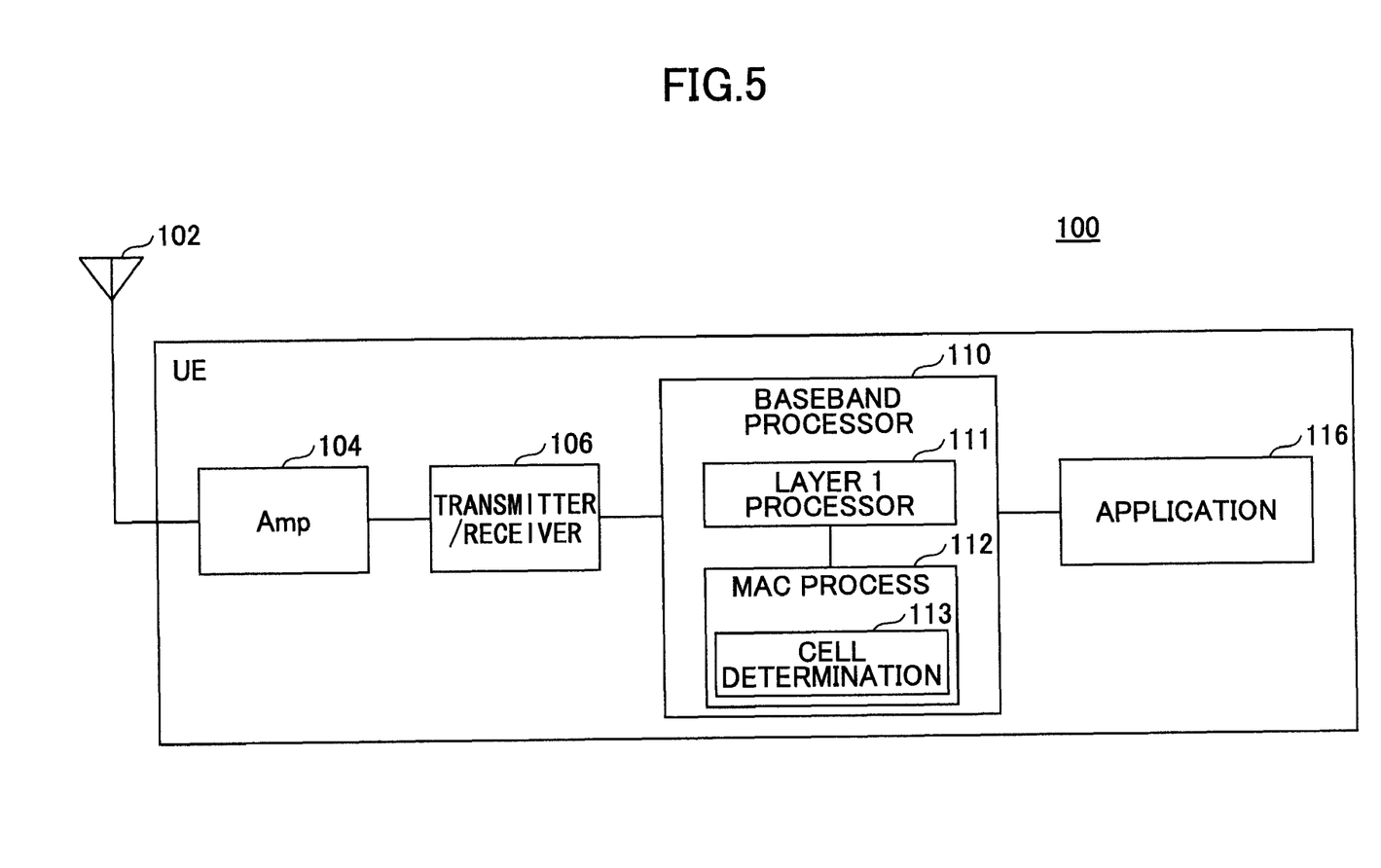
FIG. 5 is a schematic block diagram illustrating an exemplary configuration of the UE according to an embodiment of the present invention.

FIG. 5 is a block diagram illustrating an exemplary configuration of a user apparatus (US) according to one embodiment of the present invention. The user apparatus (UE) 110 has a transmit/receive antenna 102, an amplifier (amp) 104, a transmitter/receiver 106, a base band signal processor 110, and an application unit 116. A radio frequency signal received at the transmit/receive antenna 102 is amplified at the amplifier 104 and frequency converted at the transmitter/receiver 106 to convert the result to abase band signal. This base band signal is sent to the base band signal processor 110, in which an FFT process and a receive process such as error correction, decoding, etc., are performed. Downlink user data is transmitted to the application unit 110, where a process related to a layer above the MAC layer is performed.

The base band signal processor 110 includes a layer 1 processor 111 and a MAC (Medium Access Control) processor 112. The MAC processor 112 has a cell determining unit 113. The layer 1 processor 111 performs an FFT process and a channel decoding of the L1/L2 control channel, and the P-BCH, which is received in downlink. The decoded results of these channels are sent to the MAC processor 112. The MAC processor 112 detects a transmit timing of the L1/L2 control channel based on the decoded results of the P-BCH received from the layer 1 processor 111. Moreover, based on the decoded results of the L1/L2 control channel received from the layer 1 processor 111, an SU-1 resource location is detected to instruct the transmitter/receiver 106 regarding a resource block to be received.

The cell determining unit 113 of the MAC processor 112 determines whether the cell is the dominant cell or the subordinate cell based on the decoded results of the SU-1 sent from the layer 1 processor 111. The cell may be determined by looking at the value of the D/S display flag of the SU-1, or by whether a field 11a for scheduling information for the following SU is present. As a result of the determination, if it is determined that the cell is the dominant cell, the location is registered in an uplink channel (for example, a random access channel).

The configuration as described above makes it possible to reduce overhead and makes it possible for a mobile station to easily determine whether a cell is a dominant cell or a subordinate cell in a mobile communications system which carries multiple carrier frequencies.

The present international application claims priority based on Japanese Patent Application No. 2007-073735 filed on Mar. 20, 2007, the entire contents of which are hereby incorporated by reference.

The invention claimed is:

1. A method of transmitting cell information, comprising the steps of:
  transmitting, with a transmitter, a primary broadcast channel at constant intervals in a cell of a mobile communications system;
  broadcasting, with the transmitter, in the primary broadcast channel, scheduling information indicating a location of a first scheduling unit, including information to be broadcast in the cell; and
  broadcasting, with the transmitter, in the first scheduling unit, information indicating whether the cell is a dominant cell or a subordinate cell, wherein the first scheduling unit further includes information indicating a location of a second scheduling unit, including additional information to be broadcast in the dominant cell, when reported in the dominant cell, and wherein a presence of information indicating a location of the second scheduling unit allows determining whether the cell is the dominant cell or the subordinate cell.

2. The method of transmitting cell information as claimed in claim 1, wherein the first scheduling unit includes a flag indicating whether the cell is a dominant cell or a subordinate cell.

3. The method of transmitting cell information as claimed in claim 1, wherein a transmit timing of a physical control channel which indicates a location of the first scheduling unit is specified in the primary broadcast channel, and wherein a resource used in transmitting the first scheduling unit is specified in the physical control channel.

4. The method of transmitting cell information as claimed in claim 1, wherein the first scheduling unit further includes information indicating a location of a second scheduling unit, including additional information to be broadcast in the cell.

5. A user apparatus, comprising:

a transmitter and receiver which receives a primary broadcast channel from a cell of a mobile communications system and which further receives a first scheduling unit specified in the primary broadcast channel; and a cell determining unit which analyzes the first scheduling unit and determines whether the cell is a dominant cell or a subordinate cell, wherein the cell determining unit determines whether the first scheduling unit includes information indicating a location of a second scheduling unit, including additional information to be broadcast in the cell, and determines that the cell is the dominant cell if the information indicating the location of the second scheduling unit is included.

6. The user apparatus as claimed in claim 5, wherein the cell determining unit detects a flag included in the first scheduling unit to determine whether the cell is the dominant cell or the subordinate cell.

7. The cell apparatus as claimed in claim 5, wherein the transmitter and receiver receives a physical control channel specified in the primary broadcast channel, and receives the first scheduling unit in a resource specified in the physical control channel.

* * * * *